(12) United States Patent
Hashizume

(10) Patent No.: US 9,094,642 B2
(45) Date of Patent: Jul. 28, 2015

(54) COLOR IMAGE PROCESSING APPARATUS AND METHOD FOR PROCESSING COLOR IMAGE

(71) Applicant: CANON KABUSHIKI KAISHA, Tokyo (JP)

(72) Inventor: Asako Hashizume, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/592,035

(22) Filed: Jan. 8, 2015

(65) Prior Publication Data

US 2015/0124272 A1   May 7, 2015

Related U.S. Application Data

(63) Continuation of application No. 14/197,168, filed on Mar. 4, 2014, now Pat. No. 8,958,128.

(30) Foreign Application Priority Data

Mar. 5, 2013  (JP) .................................. 2013-043044

(51) Int. Cl.
  *H04N 1/50*      (2006.01)
  *G06K 15/02*   (2006.01)
  *H04N 1/60*      (2006.01)
  *G06F 15/00*   (2006.01)

(52) U.S. Cl.
  CPC ............. *H04N 1/50* (2013.01); *G06K 15/1878* (2013.01); *H04N 1/6027* (2013.01); *H04N 2201/0094* (2013.01)

(58) Field of Classification Search
  None
  See application file for complete search history.

(56) References Cited

U.S. PATENT DOCUMENTS 7,859,729 B2 *  12/2010  Ido .................................. 358/518
  2009/0174909 A1 *  7/2009  Li et al. ......................... 358/3.27
  2009/0316166 A1 *  12/2009  Kubo et al. ..................... 358/1.9

FOREIGN PATENT DOCUMENTS

JP     2011-254350 A     12/2011

* cited by examiner

*Primary Examiner* — Quang N Vo
(74) *Attorney, Agent, or Firm* — Canon USA Inc. IP Division

(57) ABSTRACT

In a color image processing apparatus in the present invention, correction values used for causing reproduction characteristics of multi-colors formed by an image forming unit to be close to target values are obtained using results of measurement of colors of multi-color patch images formed by the image forming unit using a plurality of recording materials. The color image processing apparatus includes a first processing unit configured to, when the image forming unit forms a color image, execute a correction process using the correction values, a second processing unit configured to, when the image forming unit forms the color image, execute the correction process without using at least some of the correction values or not to execute the correction process, and a control unit configured to selectively cause the first processing unit and the second processing unit to operate.

13 Claims, 10 Drawing Sheets

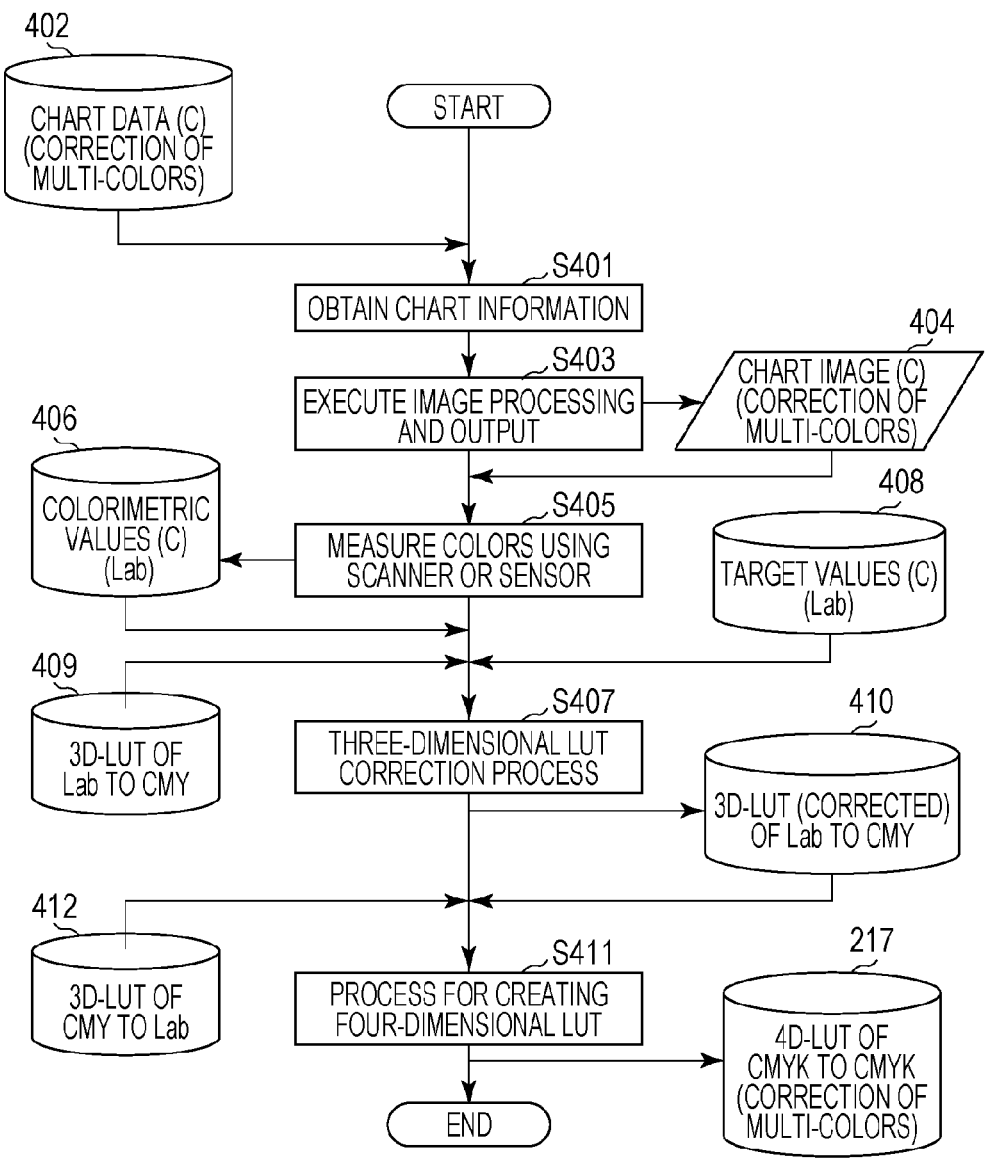

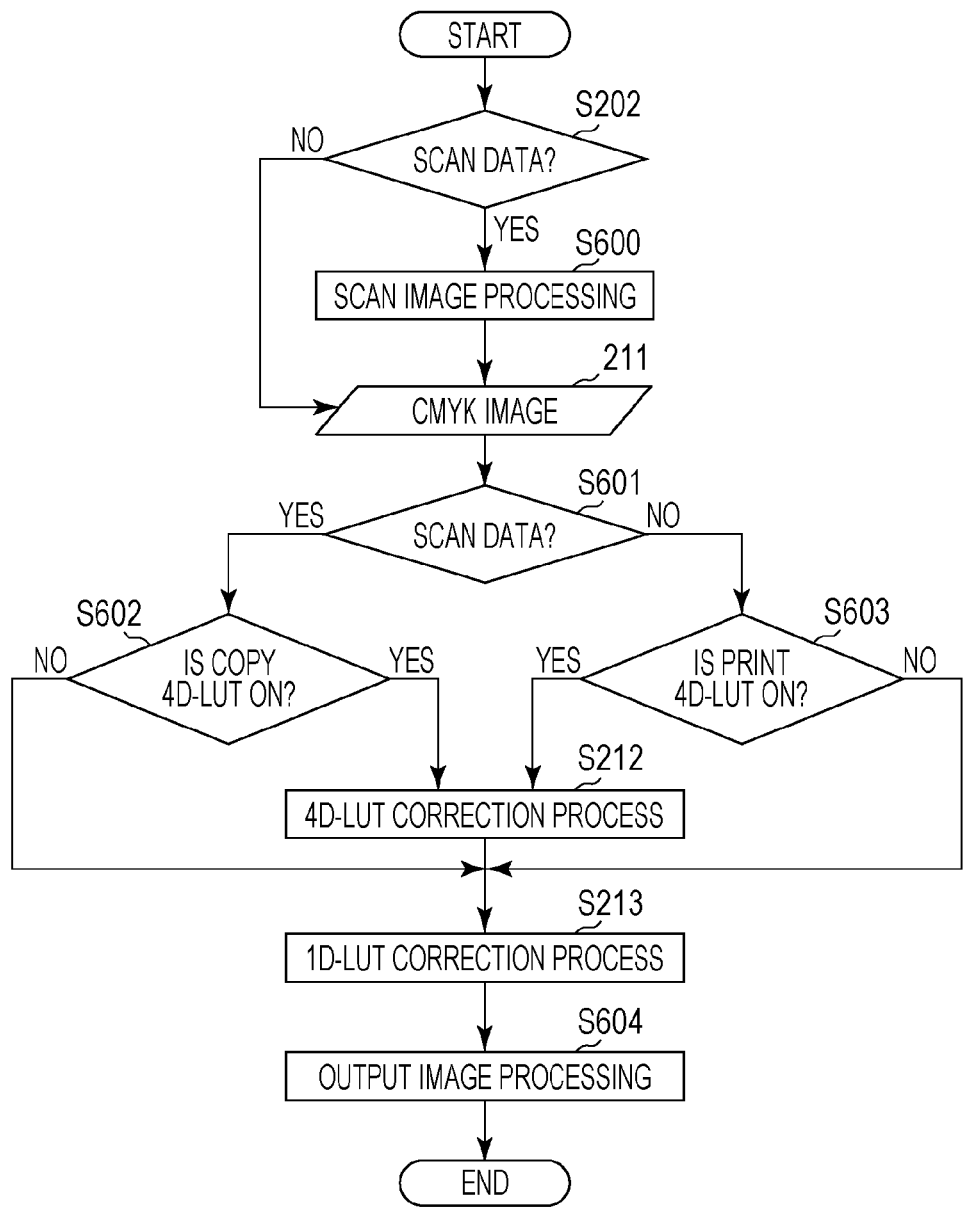

COLOR IMAGE PROCESSING APPARATUS AND METHOD FOR PROCESSING COLOR IMAGE

CROSS REFERENCE TO RELATED APPLICATIONS

The present application is a Continuation of U.S. patent application Ser. No. 14/197,168 filed Mar. 4, 2014, which claims the benefit of priority from Japanese Patent Application No. 2013-043044 filed Mar. 5, 2013, each of which is hereby incorporated by reference herein in their entirety.

BACKGROUND OF THE INVENTION

1. Field of the Invention

The present invention relates to a color image processing apparatus and a method for processing a color image for correcting colors of an image output from a printer.

2. Description of the Related Art

In these years, as the performance of electrophotographic apparatuses improves, machines that realize the same image quality as printers are being developed. However, there is still a problem in that the amount of variation in color is larger than that of printers due to instability unique to electronic photographs. Therefore, various calibration techniques are incorporated into existing electrophotographic apparatuses.

Some of the existing electrophotographic apparatuses are provided with a calibration technique in which one-dimensional tone correction lookup table (LUT) corresponding to cyan, magenta, yellow, and black (C, M, Y, and K) toner is created in order to correct primary colors. A LUT is a table indicating output data corresponding to input data divided at certain intervals, and is capable of expressing nonlinear characteristics that are hard to express with an arithmetic expressions. When calibration for these "single colors" (hereinafter referred to as "single-color calibration"), each of which indicates a color expressed by the C, M, Y, or K toner, have been executed, the reproduction characteristics of the single colors such as maximum densities and tone are corrected.

In addition, recently, a technique for performing calibration for "multi-colors" using a four-dimensional LUT has been proposed in Japanese Patent Laid-Open No. 2011-254350. Here, the "multi-colors" refer to colors for each of which a plurality of colors of toner are used, such as red, green, and blue for which two colors among C, M, and Y are used and gray for which C, M, and Y are used. In particular, in the case of electronic photographs, even if the tonal characteristics of the single colors are corrected using a one-dimensional LUT, nonlinear differences are likely to be generated when the "multi-colors" are expressed using a plurality of colors of toner. Here, if calibration for the multi-colors is executed, the color reproduction characteristics of the multi-colors expressed as combinations (overlaps or the like) between a plurality of colors of toner are corrected.

A procedure of calibration including the "multi-colors" will be described. First, patch images are printed on a recording medium such as a sheet of paper using chart data including the single colors in order to perform calibration for the "single colors". Each of the patch images is an image for measuring a color having a uniform density and a certain area. A pattern image is obtained by generating a plurality of patch images whose colors are different and printing the generated patch images on a recording medium. The recording medium such as a sheet of paper on which the pattern image is printed is read by a scanner or a sensor to read the patch images. Data obtained by reading the patch images is compared with predetermined target values, and a one-dimensional LUT for correcting differences from the target values is created. Next, patch images are printed on a recording medium using chart data including the multi-colors that reflect the one-dimensional LUT created before in order to perform the calibration for the "multi-colors", and the patch images are read by the scanner or the sensor. Data obtained by reading the patch images are compared with predetermined target values, and a four-dimensional LUT for correcting differences from the target values is created.

In an image processing apparatus, the values of the multi-colors vary in a nonlinear manner due to various factors caused during a process for forming an image. For example, toner transferred to a transfer belt in a secondary transfer can come off before next toner is transferred. It is difficult to predict the amount of toner that comes off because the amount does not depend on the amount of toner transferred. Therefore, the values of the multi-colors vary in a nonlinear manner. In order to correct the nonlinear variation in the values of the multi-colors, multi-color calibration is executed. Correction values obtained by executing the multi-color calibration are created in order to minimize color differences between colorimetric values and target values in a Lab space. Therefore, when a difference between a colorimetric value and a target value for a certain color is large in the Lab space, the mixing ratio of C, M, Y, and K that form the color is changed and the value in the Lab space is smoothed in order to minimize the difference. As a result, the colorimetric value for the certain color becomes close to the target value, and the correction seems to have been appropriately performed. When the amount of change in the ratio is large, however, the balance between the mixing ratios of C, M, Y, and K of a grid point indicating a certain color in the Lab space and a grid point located close to the aforementioned grid point is lost. In addition, since smoothing in CMYK values is not performed, continuity is not secured. That is, whereas the color value of each color becomes close to a target value in the Lab space, the continuity of the mixing ratios of C, M, Y, and K between a color to be paid attention to and surrounding colors can be lost. Thus, when the amount of correction performed using these correction values becomes large, it is likely that the continuity of tone is lost in a smooth image printed using results of the correction, such as a gradation image.

In addition, one of the reasons why the amount of correction obtained by executing the multi-color calibration becomes large is that the reproduction characteristics of the multi-colors have been significantly deviated from reference characteristics due to deterioration over time.

As described above, when a process for correcting the reproduction characteristics is executed when a color image is formed, the continuity of tone in the image can be lost if correction values obtained by executing the multi-color calibration are used, and accordingly an image desired by a user might not be reproduced.

SUMMARY OF THE INVENTION

The present invention provides a color image processing apparatus including an obtaining unit configured to obtain correction values used for causing reproduction characteristics of multi-colors formed by an image forming unit to be close to target values using results of measurement of colors of multi-color patch images formed by the image forming unit using a plurality of recording materials, a first processing unit configured to, when the image forming unit forms a color image, execute a correction process for causing the reproduction characteristics of the multi-colors formed by the image forming unit to be close to the target values using the correction values obtained by the obtaining unit, a second processing unit configured to, when the image forming unit forms the color image, execute the correction process for causing the reproduction characteristics of the multi-colors formed by the image forming unit to be close to the target values without using at least some of the correction values obtained by the obtaining unit or not to execute the correction process for causing the reproduction characteristics of the multi-colors formed by the image forming unit to be close to the target values, and a control unit configured to selectively cause the first processing unit and the second processing unit to operate.

According to the present invention, it is possible to switch whether or not to apply all results of correction obtained by executing the multi-color calibration when a color image is formed. Therefore, it is possible to avoid occurrence of a problem in the continuity of tone in an image printed using the results of the correction obtained by executing the multi-color calibration.

Further features of the present invention will become apparent from the following description of exemplary embodiments with reference to the attached drawings.

BRIEF DESCRIPTION OF THE DRAWINGS

FIG. 4 is a diagram illustrating a procedure of a multi-color calibration process.

FIG. 6 is a flowchart illustrating a procedure of processing according to a first embodiment.

DESCRIPTION OF THE EMBODIMENTS

First Embodiment

Embodiments of the present invention will be described hereinafter with reference to the drawings.

Figure 1:
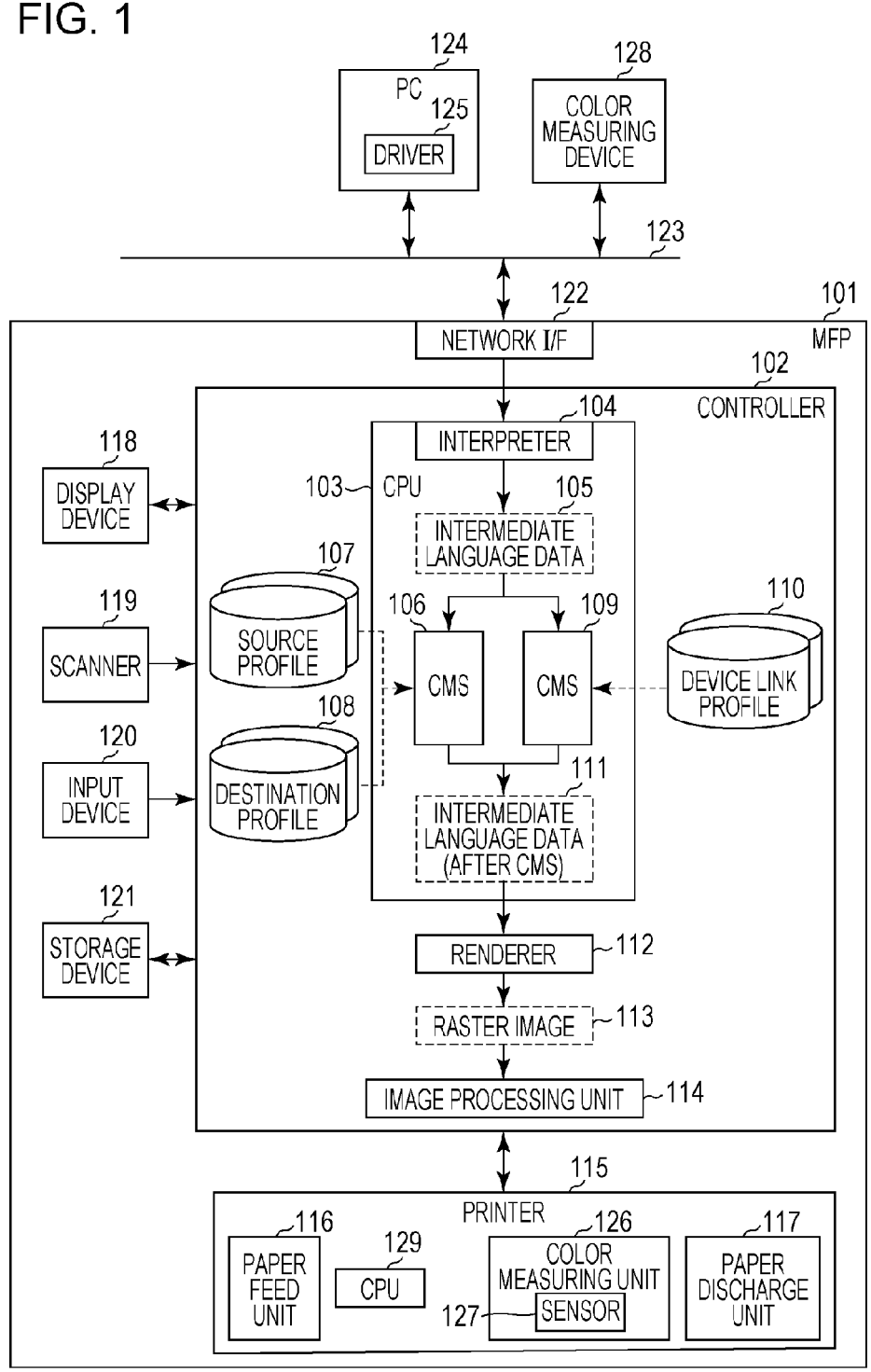
FIG. 1 is a diagram illustrating the configuration of a system.

FIG. 1 is a diagram illustrating the configuration of a system according to this embodiment. A multifunction printer (MFP) 101, which is a color image processing apparatus that uses cyan, magenta, yellow, and black (hereinafter referred to as "C, M, Y, and K") toner, is connected to other network-compatible devices through a network 123. In addition, a personal computer (PC) 124 is connected to the MFP 101 through the network 123. A printer driver 125 included in the PC 124 transmits print data to the MFP 101.

The MFP 101 will be described in detail. A network interface (I/F) 122 receives print data and the like. A controller 102 includes a central processing unit (CPU) 103, a renderer 112, and an image processing unit 114. An interpreter 104 included in the CPU 103 interprets a page description language (PDL) portion of received print data, and generates intermediate language data 105.

A CMS 106 performs color conversion using a source profile 107 and a destination profile 108 to generate intermediate language data (after the CMS) 111. Here, the CMS refers to a "Color Management System", and performs color conversion using information regarding profiles that will be described later. In addition, the source profile 107 is a profile for converting a color space such as RGB or CMYK that depends on a device into a color space such as L*a*b* (hereinafter referred to as "Lab") or XYZ that has been defined by the International Commission on Illumination (CIE) and that does not depend on the device. As with Lab, XYZ is a color space that does not depend on the device, and represents colors using three types of stimulus values. In addition, the destination profile 108 is a profile for converting a device-independent color space into a CMYK color space that depends on the device (printer 115).

On the other hand, a CMS 109 performs color conversion using a device link profile 110 to generate the intermediate language data (after the CMS) 111. Here, the device link profile 110 is a profile for directly converting a device-dependent color space such as RGB or CMYK into a CMYK color space that depends on the device (printer 115). Whether the CMS 106 or the CMS 109 is selected depends on the setting of the printer driver 125.

Although the plurality of CMSs (106 and 109) are used in accordance with the types of profiles (107, 108, and 110) in this embodiment, a plurality of types of profiles may be handled by a single CMS, instead. In addition, the types of profiles are not limited to the examples taken in this embodiment, but any type of profile may be used insofar as the device-dependent CMYK color space of the printer 115 is used.

The renderer 112 generates a raster image 113 from the intermediate language data (after the CMS) 111. The image processing unit 114 performs image processing on the raster image 113 and an image read by a scanner 119. The image processing unit 114 will be described in detail later.

The printer 115 connected to the controller 102 is a printer that forms a color image on a sheet of paper with color toner such as C, M, Y, and K using output data. The printer 115 includes a paper feed unit 116 that feeds sheets of paper, a paper discharge unit 117 that discharges sheets of paper on which images have been formed, and a color measuring unit 126.

The color measuring unit 126 includes a sensor 127 thereof capable of obtaining spectral reflectance and values in a color space such as Lab or XYZ that does not depend on the device, and is controlled by a CPU 129 that controls the printer 115. The color measuring unit 126 measures the colors of patch images printed by the printer 115 on a recording medium such as a sheet of paper. Each of the patch images is an image for measuring a color having a uniform density and a certain area. A pattern image is obtained by generating a plurality of patch images whose colors are different and printing the generated patch images on a recording medium. The pattern image is read by the sensor 127 included in the color measuring unit 126, and read numerical information is transmitted to the controller 102. The controller 102 performs calculation using the numerical information, and uses results of the calculation when single-color calibration or multi-color calibration is executed.

A display device 118 is a user interface (UI) that displays instructions to a user and the state of the MFP 101. The display device 118 is used when the single-color calibration or the multi-color calibration, which will be described later, is executed.

The scanner 119 is a scanner including an automatic document feeder. The scanner 119 radiates light onto a stack of document images or a single document image using a light source, which is not illustrated, and forms a reflected document image on a solid-state imaging device such as a charge-coupled device (CCD) sensor using a lens. Thereafter, raster-like read image signals are obtained from the solid-state imaging device as image data.

An input device 120 is an interface for receiving an input from the user. Part of the input device may be realized as a touch panel and incorporated into the display device 118.

A storage device 121 saves data processed by the controller 102, data received by the controller 102, and the like.

A color measuring device 128 is an external device for color measurement located in the network 123 or connected to the PC 124, and, as with the color measuring unit 126, is capable of obtaining spectral reflectance and values in a color space such as Lab or XYZ that does not depend on the device.

Figure 2:
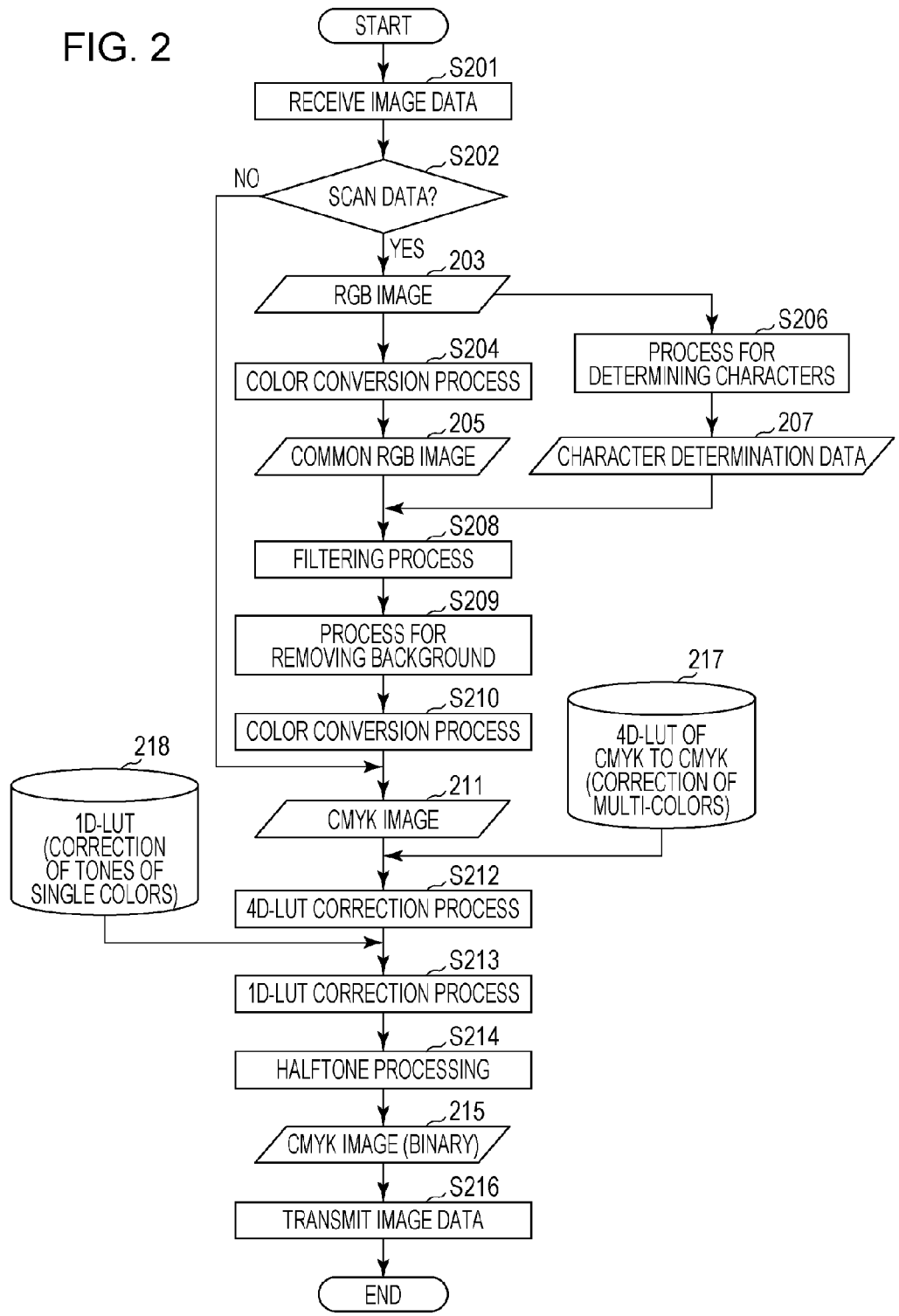
FIG. 2 is a diagram illustrating a procedure of image processing.

Next, a procedure performed by the image processing unit 114 will be described with reference to FIG. 2. FIG. 2 illustrates the procedure of image processing performed on the raster image 113 or an image read by the scanner 119. The procedure of processing illustrated in FIG. 2 is realized when executed by an application-specific integrated circuit (ASIC), which is not illustrated, included in the image processing unit 114.

In step S201, image data is received. Next, in step S202, whether the received data is scan data received from the scanner 119 or the raster image 113 transmitted from the printer driver 125 is determined.

When the received data is not scan data, the received data is the raster image 113 that has been bit-mapped by the renderer 112, and a CMYK image 211 has been obtained by converting, using a CMS, the raster image 113 into CMYK data that depends on the printer device.

In the case of scan data, the received data is an RGB image 203, and therefore a color conversion process is performed in step S204 to generate a common RGB image 205. Here, the common RGB image 205 is defined by an RGB color space that does not depend on the device, and can be converted into a device-independent color space such as Lab by calculation.

On the other hand, in step S206, a process for determining characters is performed to generate character determination data 207. Here, the character determination data 207 is generated by detecting edges of an image or the like.

Next, in step S208, a filtering process is performed on the common RGB image 205 using the character determination data 207. Here, different filtering processes are performed for a character portion and other portions using the character determination data 207.

Next, a process for removing the background is performed in step S209 and a process for converting colors is performed in step S210 to generate the CMYK image 211 from which the background has been removed.

Next, in step S212, a multi-color correction process is performed using a 4D-LUT 217. The 4D-LUT 217 is a four-dimensional LUT that converts a combination between signal values at a time when the C, M, Y, and K toner is output into a different combination between signal values of C, M, Y, and K. The 4D-LUT 217 is generated by the "multi-color calibration", which will be described later. By using the 4D-LUT 217, "multi-colors", each of which is a color obtained by using a plurality of colors of toner, can be corrected.

After correcting the multi-colors in step S212, the image processing unit 114 corrects the tonal characteristics of single colors of C, M, Y, and K using a 1D-LUT 218 in step S213. The 1D-LUT 218 is a one-dimensional LUT that corrects colors (single colors) of C, M, Y, and K. The 1D-LUT 218 is generated by the "single-color calibration", which will be described later.

Finally, in step S214, the image processing unit 114 creates a CMYK image (binary) 215 by performing halftone processing such as screen processing or error diffusion processing, and in step S216, transmits image data to the printer 115.

The "single-color calibration", which corrects the tonal characteristics of the single colors output from the printer 115, will be described with reference to FIG. 3. By executing the single-color calibration, the color reproduction characteristics of the single colors such as maximum density characteristics and the tonal characteristics are corrected. The reproduction characteristics of colors corresponding to the C, M, Y, and K toner used by the printer 115 are simultaneously corrected when the calibration is executed. That is, the process illustrated in FIG. 3 is executed for the colors C, M, Y, and K at once.

Figure 3:
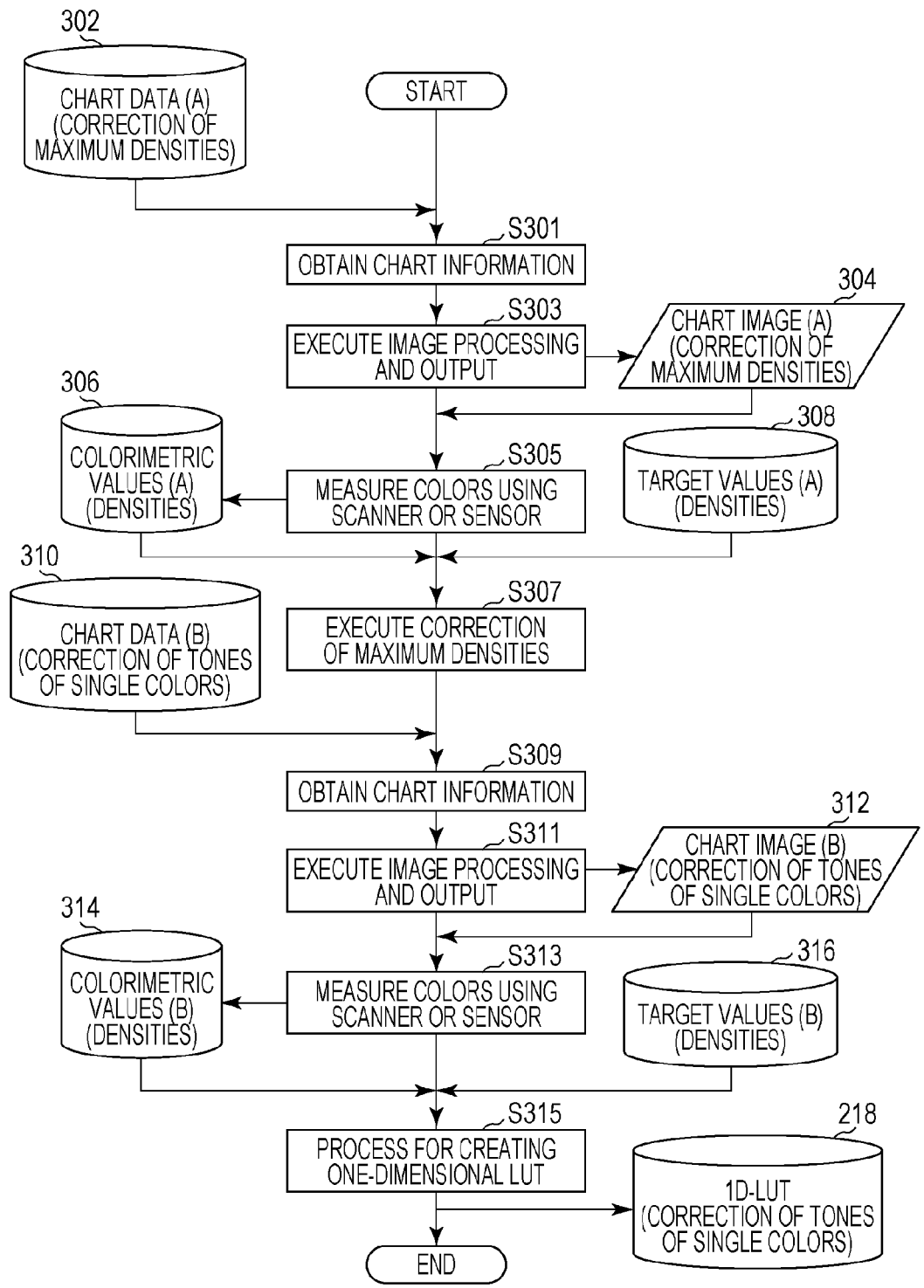
FIG. 3 is a diagram illustrating a procedure of a single-color calibration process.

FIG. 3 illustrates a procedure of a process for creating the 1D-LUT 218 that corrects the tonal characteristics of single colors. The procedure of the process illustrated in FIG. 3 is realized when executed by the CPU 103, and the created 1D-LUT 218 is saved to the storage device 121. In addition, the display device 118 displays instructions to the user on the UI, and the input device 120 receives instructions from the user.

In step S301, chart data (A) 302 stored in the storage device 121 is obtained. The chart data (A) 302 is used for correcting the maximum density of each of the single colors, and includes signal values (for example, 255) at which maximum density data regarding the "single colors", namely C, M, Y, and K, are obtained.

Figure 5A:
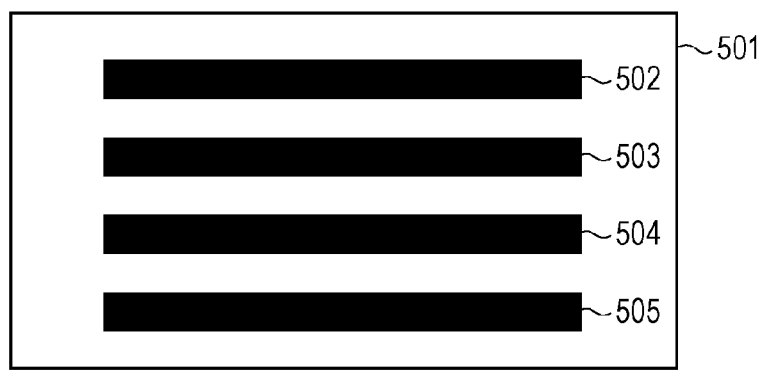
FIGS. 5A to 5C are diagrams illustrating charts used for single-color and multi-color calibration.

Next, in step S303, the image processing unit 114 executes image processing on the chart data (A) 302, and the printer 115 prints a chart image (A) 304, which is a pattern image. An example is illustrated in FIG. 5A. An example 501 illustrated in FIG. 5A is an example at a time when the chart data (A) 302 has been printed, and patch images 502, 503, 504, and 505 are printed at the maximum densities of the colors of C, M, Y, and K, respectively. Thus, the chart image (A) 304, which is a pattern image, includes a plurality of patch images. Here, in S214, the image processing unit 114 performs only the halftone processing, and does not perform the 1D-LUT correction process in step S213 or the 4D-LUT correction process in step S212.

Next, in step S305, the densities of the printed chart image (A) 304 are measured by the scanner 119 or the sensor 127 included in the color measuring unit 126, and colorimetric values (A) 306 are obtained. The colorimetric values (A) 306 are density values of the colors of C, M, Y, and K. Next, in step S307, the maximum densities of the colorimetric values (A) 306 of the colors are corrected using the colorimetric values (A) 306 and predetermined target values (A) 308 of the maximum density values. Here, device setting values of the printer 115, that is, for example, laser outputs, development biases, and the like are adjusted such that the maximum densities become close to the target values (A) 308.

Figure 5B:
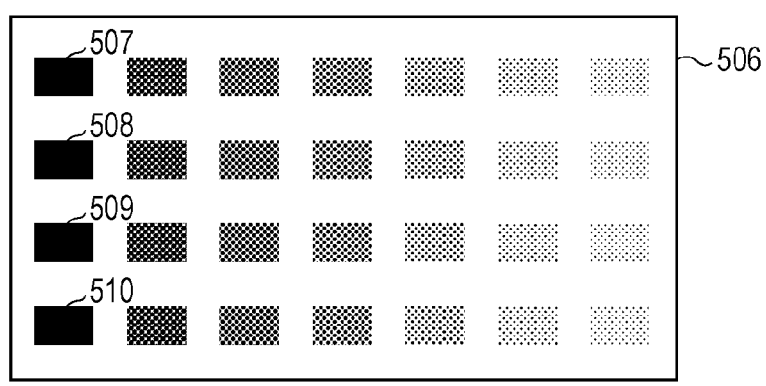

Next, in step S309, chart data (B) 310 stored in the storage device 121 is obtained. The chart data (B) 310 includes signal values of tonal data regarding the "single colors", namely C, M, Y, and K. An example of a chart image (B) 312, which is a pattern image including patch images printed on a recording medium using the chart data (B) 310, is illustrated in FIG. 5B. An example 506 illustrated in FIG. 5B is an example of the printed chart image (B) 312 including the patch images printed on the recording medium using the chart data (B) 310. Patch images 507, 508, 509, and 510 and tonal data on the right illustrated in FIG. 5B are configured by tonal data regarding the colors of C, M, Y, and K. Thus, the chart image (B) 312, which is a pattern image, includes a plurality of patch images.

Next, in step S311, the image processing unit 114 executes image processing on the chart data (B) 310, and the printer 115 prints the chart image (B) 312. Here, the image processing unit 114 performs only the halftone processing in step S214, and does not perform the 1D-LUT correction process in step S213 or the 4D-LUT correction process in step S212. In addition, since the printer 115 has performed the maximum density correction in step S307, the maximum densities can now have substantially the same values as the target values (A) 308.

Next, in step S313, the scanner 119 or the sensor 127 measures the colors to obtain colorimetric values (B) 314. The colorimetric values (B) 314 are density values obtained from the tones of the colors of C, M, Y, and K. Next, in step S315, the 1D-LUT 218, which corrects the tones of the single colors, is created using the colorimetric values (B) 314 and the predetermined target values (B) 316.

Next, the "multi-color calibration", which corrects the characteristics of multi-colors output from the printer 115, will be described with reference to FIG. 4. By executing the multi-color calibration, the reproduction characteristics of multi-colors expressed by combinations (overlaps or the like) between a plurality of colors of toner are corrected. The following procedure of processing is realized when executed by the CPU 103 included in the controller 102. The obtained 4D-LUT 217 is saved to the storage device 121. In addition, the display device 118 displays instructions to the user on the UI, and the input device 120 receives instructions from the user.

The multi-color calibration corrects the multi-colors output from the printer 115 after the single-color calibration is performed. Therefore, it is desirable to perform the multi-color calibration immediately after the single-color calibration is performed.

Figure 5C:
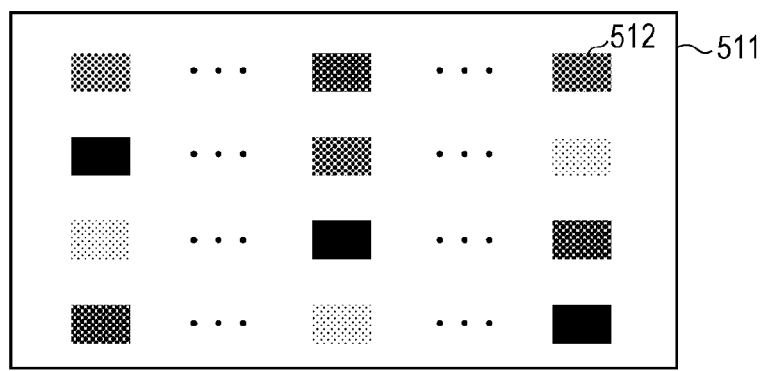

In step S401, information regarding chart data (C) 402 including "multi-colors" stored in the storage device 121 is obtained. The chart data (C) 402 is data for correcting the multi-colors, and includes signal values of the "multi-colors", which are combinations between C, M, Y, and K. An example of a chart image (C) 404, which is a pattern image including a plurality of patch images printed on a recording medium using the chart data (C) 402, is illustrated in FIG. 5C. An example 511 illustrated in FIG. 5C illustrates an example at a time when the chart data (C) 402 has been printed, and a patch image 512 and all other patch images printed in the example 511 are configured by multi-colors, which are combinations between C, M, Y, and K. Thus, the chart image (C) 404, which is a pattern image, includes a plurality of patch images.

Next, in step S403, the image processing unit 114 executes image processing on the chart data (C) 402, and the printer 115 prints the chart image (C) 404. Since the multi-color calibration corrects the multi-color characteristics of the device after the single-color calibration is performed, the image processing unit 114 uses the 1D-LUT 218 created in the single-color calibration to execute the image processing.

Next, in step S405, the multi-colors of the printed chart image (C) 404 are measured using the scanner 119 or the sensor 127 included in the color measuring unit 126 to obtain colorimetric values (C) 406. The colorimetric values (C) 406 indicate the multi-color characteristics of the printer 115 after the single-color calibration is performed. In addition, the colorimetric values (C) 406 are values in a color space that does not depend on the device, and the color space is Lab in this embodiment. When the scanner 119 has been used, RGB values are converted into Lab values using a 3D-LUT, which is not illustrated, or the like.

Next, in step S407, a 3D-LUT 409 of Lab to CMY stored in the storage device 121 is obtained, and a 3D-LUT (corrected) 410 of Lab to CMY is created by reflecting differences between the colorimetric values (C) 406 and predetermined target values (C) 408. Here, the 3D-LUT of Lab to CMY refers to a three-dimensional LUT that outputs CMY values corresponding to input Lab values.

A specific method for creating the 3D-LUT (corrected) 410 of Lab to CMY will be described hereinafter. The differences between the colorimetric values (C) 406 and the predetermined target values (C) 408 are added to the input Lab values of the 3D-LUT 409 of Lab to CMY, and interpolation calculation is performed, using the 3D-LUT 409 of Lab to CMY, on the Lab values to which the differences have been added. As a result, the 3D-LUT (corrected) 410 of Lab to CMY is created.

Next, in step S411, a 3D-LUT 412 of CMY to Lab stored in the storage device 121 is obtained, and calculation is performed using the 3D-LUT (corrected) 410 of Lab to CMY. As a result, the 4D-LUT 217 of CMYK to CMYK is created. Here, the 3D-LUT of CMY to Lab is a three-dimensional LUT that outputs Lab values corresponding to input CMY values.

A specific method for creating the 4D-LUT 217 of CMYK to CMYK will be described hereinafter. A 3D-LUT of CMY to CMY is created from the 3D-LUT 412 of CMY to Lab and the 3D-LUT (corrected) 410 of Lab to CMY. Next, the 4D-LUT 217 of CMYK to CMYK is created such that an input value of K and an output value of K become the same. Here, the 3D-LUT of CMY to CMY is a three-dimensional LUT that outputs corrected CMY values corresponding to input CMY values.

Figure 12:
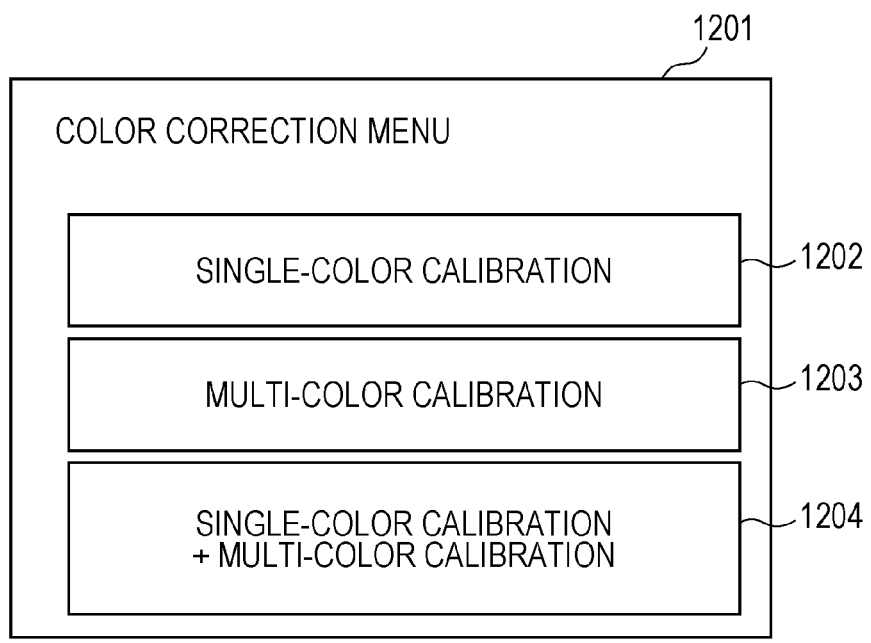
FIG. 12 is a diagram illustrating a single-color calibration and multi-color calibration execution screen.

FIG. 12 illustrates an example of UI display when the single-color calibration and the multi-color calibration are selectively executed. A UI screen 1201 illustrated in FIG. 12 is displayed on the display device 118. A button 1202 is a button for starting the single-color calibration and a button 1203 is a button for starting the multi-color calibration. In addition, a button 1204 is a button for starting calibration in which the multi-color calibration is executed after the single-color calibration is executed.

When the button 1204 has been selected, the single-color calibration begins, and after completion of the single-color calibration, the multi-color calibration begins.

More specifically, by printing the chart image (C) 404 for the multi-color calibration after the completion of the single-color calibration, the multi-color calibration begins. Alternatively, a button for starting the multi-color calibration may be displayed on the UI screen 1201 for the user and the multi-color calibration may begin when the button has been pressed by the user.

On the other hand, when the button 1202 has been selected, only the single-color calibration is executed. Similarly, when the button 1203 has been selected, only the multi-color calibration is executed.

The reason why different buttons are used for the single-color calibration and the multi-color calibration will be described. When the chart image (C) 404 used in the execution of the multi-color calibration is printed, the 1D-LUT 218 created in the single-color calibration is used. Therefore, it is desirable to correct the reproduction characteristics of the multi-colors by performing the multi-color calibration immediately after the single-color calibration, that is, immediately after the color reproduction characteristics of the single colors are corrected. However, when the two types of calibration are both executed, it takes time for the user to complete the processing of the calibration.

Therefore, in order to reduce the processing time, either the single-color calibration or the multi-color calibration is executed in accordance with a use environment of the user. As a result, the execution frequencies of the two types of calibration become different. For example, the frequency of execution of the multi-color calibration of a user who frequently performs monochrome printing is low. On the other hand, the frequency of execution of the multi-color calibration of a user who frequently performs multi-color printing such as printing of photographs is high.

In addition, timings at which this color correction menu can be selected may be controlled.

Normally the image processing apparatus is turned off at night and turned on in the morning. Therefore, when a main power supply switch of the MFP 101 has been turned on and power has been supplied, control may be performed such that only the button 1204 can be selected. Alternatively, when both the types of calibration have not been executed in a predetermined period of time, control may be performed such that only the button 1204 can be selected. Alternatively, when both the types of calibration have not been executed until printing is executed using a predetermined number of sheets of paper, control may be performed such that only the button 1204 can be selected.

Alternatively, the single-color calibration and the multi-color calibration may be sequentially executed automatically when a predetermined period of time has elapsed, when printing has been executed using a predetermined number of sheets of paper, or when power has been supplied.

As described above, when the user executes the calibration at certain timings, control is performed such that only the button 1204 can be selected so that the multi-color calibration is executed immediately after the single-color calibration is executed at predetermined time intervals.

Therefore, as described above, it is possible to select whether to execute both the types of calibration by executing the multi-color calibration after the single-color calibration is executed or execute either the single-color calibration or the multi-color calibration. As a result, it becomes possible to execute calibration in accordance with how the user uses the MFP 101.

In addition, by performing control such that only execution of both the types of calibration can be selected at the certain time intervals, it becomes possible to suppress reduction of the correction accuracy of the reproduction characteristics caused by the calibration when only one of the two types of calibration is executed.

In this embodiment, it is assumed that the button 1203 or the button 1204 illustrated in FIG. 12 is pressed and the multi-color calibration is executed.

Figure 7:
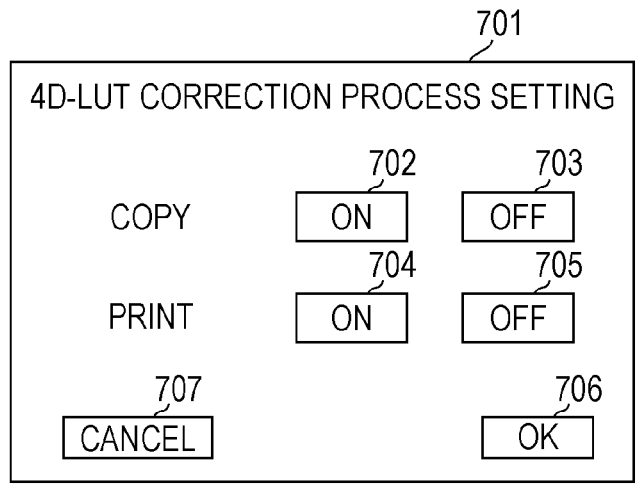
FIG. 7 illustrates an example of a UI setting screen according to the first embodiment.

FIG. 7 illustrates UIs necessary to realize this embodiment. An example of a 4D-LUT correction process setting screen 701 is displayed on the display device 118. This screen includes buttons for determining whether or not to execute the 4D-LUT correction process in S212 illustrated in FIG. 2 for a copy job, which handles scan data, and a print job, which handles electronic image data.

The scan data is obtained when data obtained by reading a document using the scanner 119 has been transmitted to the MFP 101.

On the other hand, the electronic image data is obtained when the input device 120 or the storage device 121 has transmitted data to the MFP 101.

An "ON" button 702 is a button for determining that the 4D-LUT correction process is to be executed for the copy job. In addition, an "OFF" button 703 is a button for determining that the 4D-LUT correction process is not to be executed for the copy job. The "ON" button 702 and the "OFF" button 703 are exclusively selected. Similarly, an "ON" button 704 is a button for determining that the 4D-LUT correction process S212 is to be executed for the print job. In addition, an "OFF" button 705 is a button for determining that the 4D-LUT correction process is not to be executed for the print job. The "ON" button 704 and the "OFF" button 705 are exclusively selected. An "OK" button 706 is a button used for returning to an arbitrary UI screen when this "4D-LUT correction process setting" has been completed. In addition, a "CANCEL" button 707 is a button used for returning to an arbitrary UI screen by canceling a change made to the setting.

FIG. 6 is a flowchart illustrating a procedure of processing according to this embodiment. A control program, which is not illustrated, for realizing this embodiment is stored in the storage device 121. The control program is loaded into a RAM, which is not illustrated, and executed by the CPU 103.

A method according to this embodiment will be described with reference to the procedure illustrated in the flowchart of FIG. 6.

First, in S202, whether or not image data to be processed by the printer 115 is scan data is determined. If it is determined that the image data to be processed is scan data, the procedure proceeds to S600. In S600, scan image processing is performed to generate a CMYK image 211. The scan image processing executed in S600 is the same as the image processing performed in S204 to S210 illustrated in FIG. 2. If it is determined in S202 that the image data to be processed is not scan data, the image data to be processed becomes a raster image 113 bitmapped by the renderer 112. This image data then becomes a CMYK image 211 when converted by a CMS into CMYK that depends on the printer device.

In this embodiment, control for switching a subsequent correction process in accordance with whether an image to be formed is obtained by executing a copy job or by executing a print job is performed. Therefore, next, in S601, whether or not the image data to be processed is scan data (that is, whether or not the image to be formed is obtained by executing a copy job) is determined again.

The reason why the control for switching the correction process is performed is that an effect upon an image caused by correction values obtained by executing the multi-color calibration is different between when the image to be formed is obtained by executing a copy job and when the image to be formed is obtained by executing a print job.

A specific example of the difference in the effect will be described hereinafter.

For example, when electronic image data (an image obtained by executing a print job) created by a PC, which is an information processing apparatus, is a gradation image, the image has very smooth continuity of tone. Therefore, if, when the image is printed, results of correction in which the continuity of tone is sacrificed are used for executing the multi-color calibration and, as a result, the smooth continuity of tone of the image is lost, the undesirable effect is evident.

On the other hand, when an image (an image obtained by executing a copy job) scanned by a reader is a gradation image, noise is mixed during the scanning, and accordingly the image does not have smooth continuity of tone compared to the electronic image data created by the PC.

Therefore, if, when this image is printed, results of correction in which the continuity of tone is sacrificed are used for executing the multi-color calibration and, as a result, the smooth continuity of tone of the image is lost, the undesirable effect is not so evident.

Therefore, when nonlinear correction has been performed by executing the multi-color calibration, the degree of the effect upon the printed image caused by results of the correction is different between when the image has been obtained by executing a copy job and when the image has been obtained by executing a print job. That is, the effect upon a result of the printing caused by results of the correction performed by executing the multi-color calibration is larger when the image data to be processed is electronic image data than when the image data to be processed is scan image data.

Therefore, the control for switching the correction process in accordance with whether the image to be formed is obtained by executing a copy job or by executing a print job is performed.

The same determination is made when image data temporarily saved in the storage device 121 or an external controller, which is not illustrated, is the image data to be processed. The temporarily saved image data has document management information, which includes information regarding the image data and settings for printing. When the temporarily saved image data is the image data to be processed, the temporarily saved image data is read and whether or not the image data is scan data is determined on the basis of the document management information in S601.

If it is determined in S601 that the image data to be processed is scan data, it is determined that a job to be performed to form an image is a copy job, and the procedure proceeds to S602. In S602, 4D-LUT correction process settings for the copy job are checked on the 4D-LUT correction process setting screen 701. If the "ON" button 702 is selected in the settings, the procedure proceeds to S212. In S212, the 4D-LUT correction process is performed on the image data to be processed. That is, image processing (first processing) is performed using multi-color correction values obtained by executing the multi-color calibration.

Next, in S213, the 1D-LUT correction process is performed on the image data subjected to the 4D-LUT correction process. On the other hand, if the "OFF" button 703 is selected, the procedure skips S212 and proceeds to S213. That is, image processing (second processing) is executed without using all the multi-color correction values obtained by executing the multi-color calibration. In S213, the 1D-LUT correction process is performed on the image data to be processed.

On the other hand, if it is determined in S601 that the image data to be processed is not scan data, it is determined that a job to be performed to form an image is a print job, and the procedure proceeds to S603. In S603, 4D-LUT correction process settings for the print job are checked on the 4D-LUT correction process setting screen 701. If the "ON" button 704 is selected in the settings, the procedure proceeds to S212. In S212, the 4D-LUT correction process is performed on the image data to be processed. That is, the image processing (first processing) is executed using the multi-color correction values obtained by executing the multi-color calibration. Next, in S213, the 1D-LUT correction process is performed on the image data subjected to the 4D-LUT correction process. On the other hand, if the "OFF" button 705 is selected, the procedure skips S212 and proceeds to S213. That is, the image processing (second processing) is executed without using all the multi-color correction values obtained by executing the multi-color calibration. In S213, the 1D-LUT correction process is performed on the image data to be processed. In S604, output image processing is performed on all pieces of image data subjected to the 1D-LUT correction process in S213. The output image processing in S604 is the same as the processing performed in S214 and S216 illustrated in FIG. 2.

As a result of the above procedure, a predetermined correction process can be performed on the image data to be processed when the image data to be processed is to be copied and when the image data to be processed is to be printed. That is, control can be performed such that the first processing and the second processing are selectively executed when the image data to be processed is to be copied and when the image data to be processed is to be printed.

Although the correction process using the 4D-LUT is skipped in S602 and S603 when the 4D-LUT correction process setting is "OFF", the correction process need not be skipped, and the correction may be performed using not the entirety of the 4D-LUT but part of the 4D-LUT. That is, the correction may be performed without using at least some of the multi-color correction values obtained by executing the multi-color calibration. In order to correct a limited number of points in a LAB space, patch images are created in the chart image (C) 404 created in FIG. 4 by printing only limited colors (colors that are not relevant to the continuity of tone), and a 4D-LUT (partial) is created by reading the limited number of patch images.

If the 4D-LUT correction process setting in S602 and S603 is "OFF", the correction is performed using the 4D-LUT (partial), and then the 1D-LUT correction process is performed.

As a result, the multi-color calibration is executed on the colors that are not relevant to the continuity of tone, thereby increasing the correction accuracy.

Alternatively, the correction may be performed using predetermined alternative correction values instead of the correction values obtained by executing the multi-color calibration. Unlike the multi-color correction values obtained by executing the multi-color calibration, the alternative correction values include data capable of correcting only the colors that are not relevant to the continuity of tone.

Alternatively, a timing at which the 4D-LUT correction processing setting is performed on the 4D-LUT correction process setting screen 701 may be set by the user as an arbitrary timing.

Alternatively, the setting timing may be incorporated into the procedure for performing the single-color calibration and the multi-color calibration. For example, assume that the button 1204 has been pressed in the screen illustrated in FIG. 12. At this time, the single-color calibration and the multi-color calibration are treated as a series of processes. In this case, the 4D-LUT correction process setting screen 701 may be displayed after the multi-color calibration is completed. Alternatively, the 4D-LUT correction process setting screen 701 may be displayed before the single-color calibration is executed.

Alternatively, when the button 1203 has been pressed and only the multi-color calibration is performed, the 4D-LUT correction process setting screen 701 may be displayed before or after the multi-color calibration is executed.

As described above, a setting screen may be displayed to prompt the user to set the 4D-LUT correction process. At this time, the settings in the display screen may always be reset to initial values, or may reflect previous settings.

Furthermore, when the button 1202 has been pressed and only the single-color calibration is to be performed, the 4D-LUT correction process setting screen 701 may be displayed before or after the single-color calibration is executed.

At this time, the 4D-LUT correction process setting screen 701 may be displayed with the "OFF" button 703 and the "OFF" button 705 selected, in order to have the user confirm that image processing using results of the multi-color calibration is not to be executed.

In addition, it is effective to display the 4D-LUT correction process setting screen 701 in accordance with a state at a time when the multi-color calibration has been executed. For example, when a long time has elapsed since data indicating the target values (C) 408 used for executing the multi-color calibration illustrated in FIG. 4 was stored, the amount of correction is expected to be large due to changes in the printer 115 over time. When a large amount of correction is performed, differences between target values and colorimetric values become large, thereby making it more likely to lose the continuity of tone in the image.

Therefore, in this case, the 4D-LUT correction process setting screen 701 may be displayed to prompt the user to perform image processing without using results of the correction performed by executing the multi-color calibration (without setting the 4D-LUT correction process). Alternatively, when a plurality of target values (C) 408 are stored in the storage device 121 and target values (C) 408 different from those used before have been selected and used for executing the calibration, the amount of correction used in the image processing changes. When the amount of correction has changed, the continuity of tone in the image might be affected. Therefore, in this case, the 4D-LUT correction process setting screen 701 may be displayed to prompt the user to set the 4D-LUT correction process. In addition, when an N-th (or N-th or later) operation of correction has been executed using the same target values (C) 408, the 4D-LUT correction process setting screen 701 may be displayed to prompt the user to set the 4D-LUT correction process.

Furthermore, when the MFP 101 that measures a timing at which changes in the printer 115 over time become large by monitoring an engine state of the printer 115 and that automatically prompts the user to execute the multi-color calibration is used, the user may be prompted to set the 4D-LUT correction process at this timing. For example, the 4D-LUT correction process setting screen 701 may be displayed after the calibration is executed by prompting the user to execute the calibration. In addition, when changes in the printer 115 over time are so large that execution of the calibration is canceled after prompting the user to execute the multi-color calibration, the amount of correction is likely to be large. Therefore, since the continuity of tone can be lost, the 4D-LUT correction process setting screen 701 may be displayed to prompt the user to set the 4D-LUT correction process.

As described above, whether or not to apply results of the correction obtained by executing the multi-color calibration to the formation of an image may be determined in consideration of whether the image data to be processed by the printer 115 is electronic image data or scan image data.

That is, control may be performed such that the first processing and the second processing for correcting the reproduction characteristics are selectively executed when an image is formed. As a result, a situation in which a problem arises in the continuity of tone in image data to be printed due to image processing using results of the correction obtained by executing the multi-color calibration can be avoided.

In addition, by displaying a screen for determining whether or not to perform image processing using results of the correction obtained by executing the multi-color calibration at an appropriate timing, the user may be prompted to make settings, thereby suppressing occurrence of a problem in the continuity of tone in image data to be printed.

Second Embodiment

Here, only differences from the first embodiment will be described. In this embodiment, unlike the first embodiment, whether or not to execute the 4D-LUT correction process is determined for each print job. The determination is made using the printer driver 125 of the PC 124, which is the information processing apparatus, a remote UI screen, which is not illustrated, executed by the PC 124, or the like.

Figure 8:
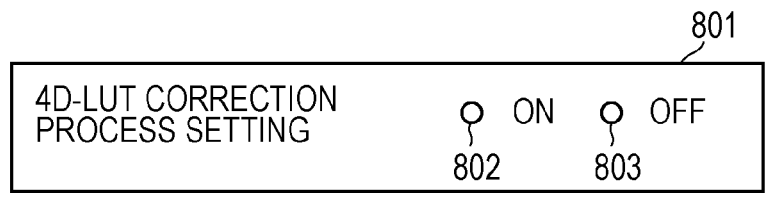
FIG. 8 illustrates an example of a UI setting screen according to a second embodiment.

FIG. 8 is an example of a UI screen according to this embodiment. Since, unlike the first embodiment, whether or not to execute the 4D-LUT correction process is determined only when a print job for printing image data to be processed is to be executed, no setting buttons for each type of job such as those in the screen illustrated in FIG. 7 are included. A setting screen 801 has a simplest possible configuration when only an item relating to the 4D-LUT correction process performed using the printer driver 125 or the remote UI screen is taken into consideration. The setting screen 801 includes a button 802 used for setting the 4D-LUT correction to "ON" and a button 803 used for setting the 4D-LUT correction process to "OFF". The "ON" button 802 and the "OFF" button 803 are exclusively selected. When the 4D-LUT correction process has been set to "ON", a first processing unit is set to form an image. When the 4D-LUT correction process has been set to "OFF", a second processing unit is set to form an image.

When the setting screen 801 pops up, the "OK" button 706 and the "CANCEL" button 707 may be displayed as in the 4D-LUT correction process setting screen 701. In addition, an "automatic" button, which is not illustrated, may be added, and a method in which a predetermined setting of the MFP 101 is followed when the "automatic" button has been selected may be added.

Even when the button 803 has been pressed and the 4D-LUT correction process has been set to "OFF", the correction may be performed using the 4D-LUT (partial) as described above.

In this case, the correction is performed using the 4D-LUT (partial), and then the 1D-LUT correction process is performed.

In this embodiment, information necessary for the user to determine whether to set the 4D-LUT correction process to "ON" or "OFF" is obtained from the controller 102 through the network 123. The information may always be displayed, or may be displayed when obtained from the controller 102 in accordance with a request from the user. The information to be displayed includes, for example, a date and time at which a latest operation of the multi-color calibration has been performed and the target values (C) 408 used. If a long time has elapsed since a previous operation of the multi-color calibration was performed, it is likely that parameters (that is, the correction values obtained by executing the multi-color calibration) indicated by the 4D-LUT 217 are not appropriate. Therefore, it can be expected that the continuity of tone in an image is lost if an image to be printed is corrected using the 4D-LUT 217.

On the other hand, if a long time has elapsed since the target values (C) 408 used in the previous operation of the multi-color calibration were stored, it is likely that the amount of correction is large. Therefore, it can be expected that the continuity of tone in an image is lost if an image to be printed is corrected using the 4D-LUT 217.

By displaying such information, the user can appropriately select whether to set the 4D-LUT correction process to "ON" or "OFF".

In addition, the user may determine that the continuity of tone in an image to be printed is high through a visual check, and set the 4D-LUT correction process to "OFF". As described above, whether or not to execute the 4D-LUT correction process S212 is determined using the printer driver 125, the remote UI screen, or the like.

As described above, whether or not to use results of the multi-color calibration can be switched in accordance with the state of the MFP 101 and the characteristics of an image to be printed each time an image is formed by executing a print job.

That is, by performing image processing using results of the correction obtained by executing the multi-color calibration on image data to be processed, it becomes possible not to execute the 4D-LUT correction process only when it has been determined that image data with which the continuity of tone in an image to be printed is likely to be lost is included.

That is, it is possible to perform control such that the above-described second processing is executed.

As a result, it is possible to maximize the effect produced by results of the multi-color calibration for each job.

Third Embodiment

Here, only differences from the above-described embodiments will be described. In this embodiment, unlike the above-described embodiments, whether or not to execute the 4D-LUT correction process is automatically switched. Whether or not gradation is included in an image to be formed is automatically determined, and the 4D-LUT correction process is not executed for a page including gradation. As a result, it is possible to avoid losing the continuity of tone in an image for each page.

Figure 10:
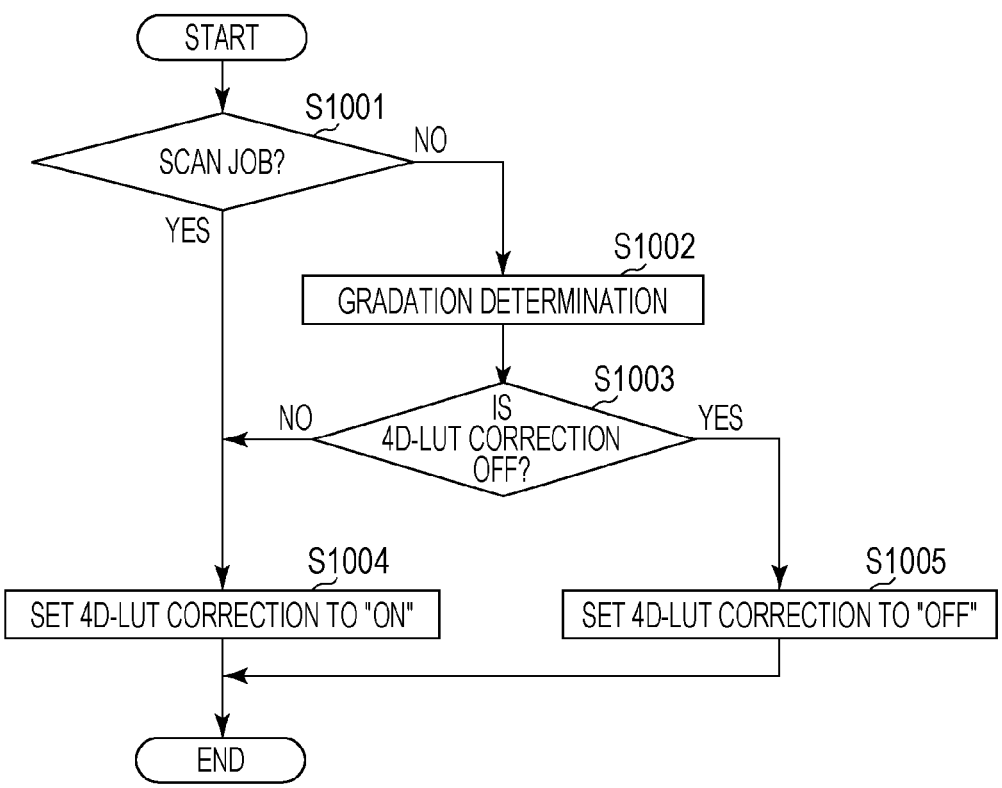
FIG. 10 is a flowchart illustrating an automatic determination according to the third embodiment.

FIG. 10 is a flowchart illustrating a procedure of a process for automatically switching whether or not to execute the 4D-LUT correction process, which is a characteristic of this embodiment. A control program, which is not illustrated, for realizing this embodiment is stored in the storage device 121. The control program is loaded into the RAM, which is not illustrated, and executed by the CPU 103. The characteristics of this method will be described with reference to the procedure illustrated in the flowchart of FIG. 10.

First, in S1001, whether or not an image to be printed by the printer 115 is obtained by executing a scan job is determined. If it is determined in S1001 that the image to be printed by the printer 115 is obtained by executing an image scan job (copy job), it is unlikely that the continuity of tone in the image is lost even if the 4D-LUT correction process is executed. Therefore, the procedure proceeds to S1004, and execution of the 4D-LUT correction process is set to "ON".

On the other hand, if it is determined in S1001 that the image is obtained by executing a job (print job) other than a scan job, the procedure proceeds to S1002. In 1002, whether or not a gradation image is included in the image is determined. In S1002, the determination as to whether or not a gradation image is included is made by analyzing image data to be processed, attribute data accompanying the image data, the intermediate language data 105, or the like. For example, if there is an object specified as gradation in the intermediate language data 105, it is determined that a gradation image is included in the image to be printed. Any other method that is effective in determining whether or not gradation is included may be used. After whether or not a gradation image is included is determined in S1002, the procedure proceeds to S1003. If it is determined in S1002 that a gradation image is included, it is determined in S1003 that the execution of the 4D-LUT correction process is to be set to "OFF", and the procedure proceeds to S1005. In S1005, the execution of the 4D-LUT correction process is set to "OFF". That is, the second processing is set. When the execution of the 4D-LUT correction process has been set to "OFF", the correction may be performed using the above-described 4D-LUT (partial). In this case, the correction is performed using the 4D-LUT (partial), and then the 1D-LUT correction process is performed.

On the other hand, if it is determined in S1002 that a gradation image is not included, it is determined in S1003 that the execution of the 4D-LUT correction process need not be set to "OFF", and the procedure proceeds to S1004. In S1004, the execution of the 4D-LUT correction process is set to "ON". That is, the first processing is set.

As a result of the above procedure, if it is determined that a gradation image is included in the image to be printed, it is automatically determined that the 4D-LUT correction process is not to be performed (results of the correction obtained by executing the multi-color calibration are not used) on the image data to be processed. As a result, it is possible to avoid losing the continuity of tone in the image including the gradation image.

Figure 9:
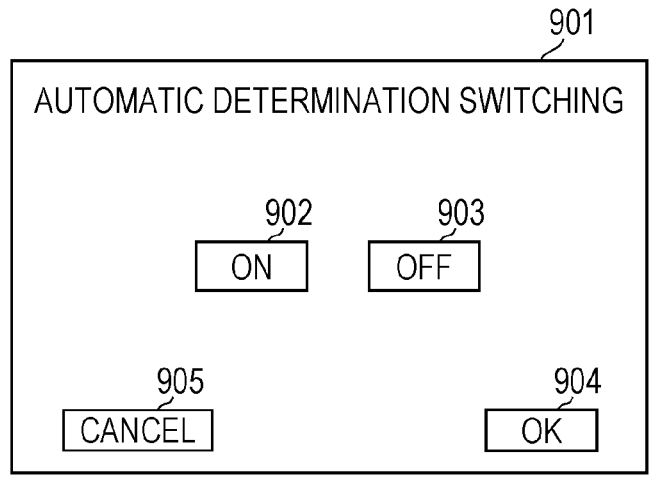
FIG. 9 illustrates an example of a UI setting screen according to a third embodiment.

In order to realize this embodiment, UIs illustrated in FIG. 9 may be displayed in a screen of the PC 124 or a screen of the display device 118.

A UI screen 901 is an example of a UI for switching whether or not to automatically determine the presence of a gradation image included in the image to be printed. An "ON" button 902 determines that an automatic determination as to the presence of a gradation image is to be executed. In addition, an "OFF" button 903 determines that an automatic determination as to the presence of a gradation image is not to be executed. The "ON" button 902 and the "OFF" button 903 are exclusively selected. An "OK" button 904 is used for returning to an arbitrary UI screen when setting has been completed. In addition, a "CANCEL" button 905 is used for returning to an arbitrary UI screen by canceling a change made to the setting. The switching of the automatic determination is effective when, for example, the accuracy with which whether or not a gradation image is included in the image to be printed is determined is not perfect or when an erroneous determination frequently occurs due to conditions such as an application used by the user and the image data to be printed.

Figure 11:
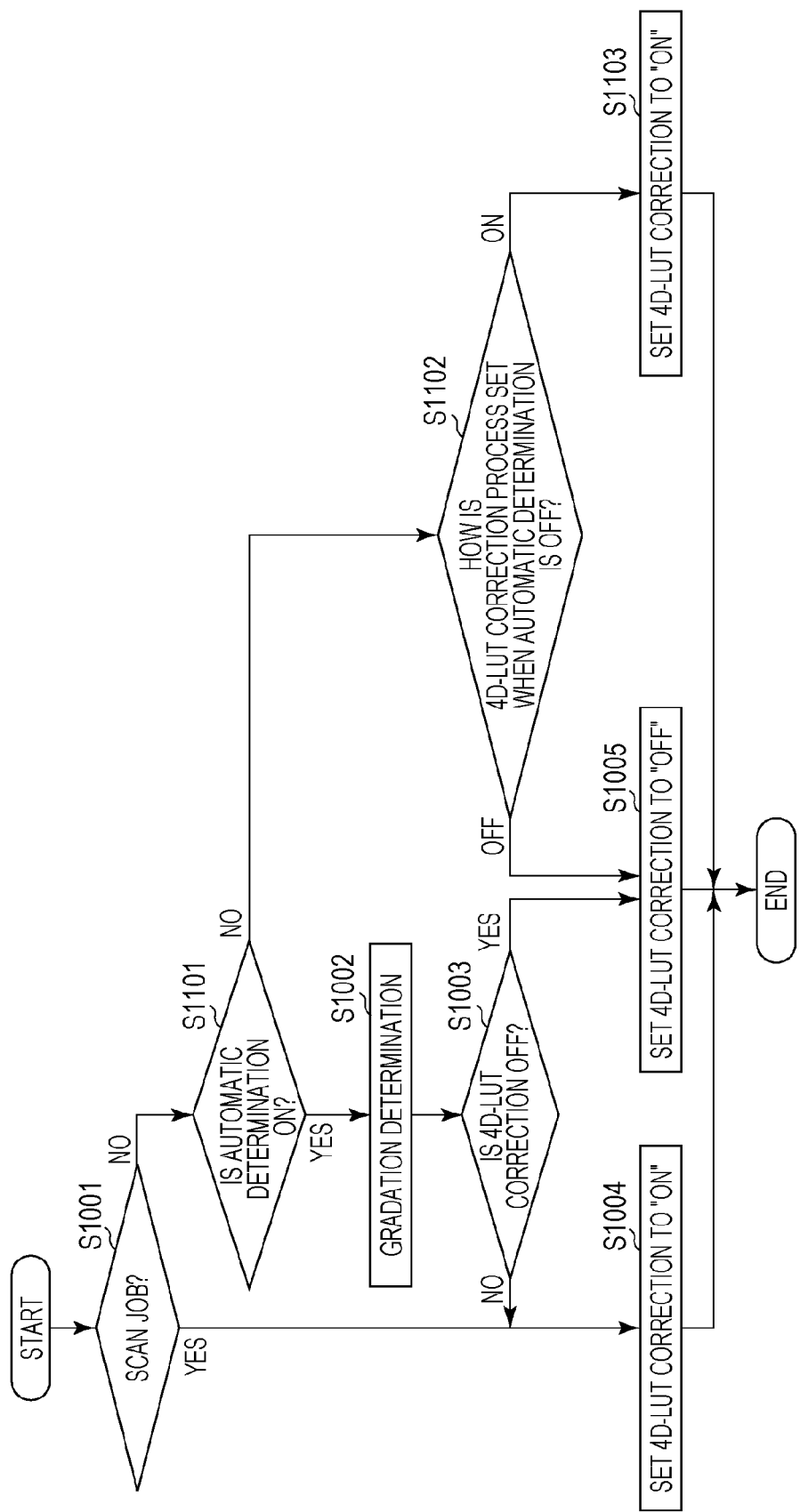
FIG. 11 is a flowchart illustrating the entirety of processing according to the third embodiment.

A process performed when the automatic determination switching screen 901 is set to "ON" is as described with reference to FIG. 10. Therefore, only a process performed when the automatic determination switching screen 901 is set to "OFF" is described with reference to FIG. 11. If it is determined in S1001 that the specified job is not a scan job (that is, the specified job is a print job), whether or not to automatically determine the presence of a gradation image in the image to be printed is checked in S1101. If the automatic determination is to be performed, that is, if the automatic determination switching screen 901 is set to "ON", the above-described process is performed. If it is determined in S1101 that the automatic determination is not to be performed, that is, if the automatic determination switching screen 901 is set to "OFF", the process proceeds to S1102. In S1102, a predetermined setting is checked.

If the automatic determination is set to "OFF" and it is determined that the 4D-LUT correction process is to be executed using the screen illustrated in FIG. 7 or FIG. 8, the process proceeds to S1103, and the 4D-LUT correction process is set to "ON".

If the automatic determination is set to "OFF" and it is determined that the 4D-LUT correction process is not to be performed using the screen illustrated in FIG. 7 or FIG. 8, the process proceeds to S1005, and the 4D-LUT correction process is set to "OFF".

If the 4D-LUT correction process is set to "OFF", the correction may be performed using the above-described 4D-LUT (partial). In this case, the correction is performed using the 4D-LUT (partial), and then the 1D-LUT correction process is performed.

In addition, if the automatic determination is set to "OFF" in the UI screen 901, instructions set for the copy job and the print job may be followed.

As described above, by determining whether or not a gradation image is included in the image to be printed, whether or not to execute the 4D-LUT correction process can be automatically switched. That is, control for selectively executing the first processing and the second processing may be automatically performed. As a result, it is possible to set the execution of the 4D-LUT correction process for each page of the image to be printed. Therefore, the effect produced by using results of the multi-color calibration can be maximized, and, with respect to a page in which the continuity of tone in the image to be printed can be lost, the execution of the 4D-LUT correction process can be set to "OFF". Furthermore, it is possible to avoid losing the continuity of tone in the image to be printed for each page with the user being not aware of the loss.

Fourth Embodiment

Here, only differences from the first embodiment will be described. In this embodiment, unlike the above-described first embodiment, control is performed such that, if it is determined that the 4D-LUT correction process is not to be executed, the multi-color calibration is not executed.

If the execution of the 4D-LUT correction process is set to "OFF" when a copy job is to be executed or when the print job is to be executed, the correction using the 4D-LUT is not performed during processing of an image even if correction values are obtained by executing the multi-color calibration. Therefore, the effect of the correction that would otherwise be produced by the multi-color calibration is not obtained. In this case, the execution of the multi-color calibration itself is wasted, and accordingly the execution of the multi-color calibration is inhibited on the display device 118. Alternatively, when the multi-color calibration has begun, the user may be informed that the correction process is not effective.

As described above, when the execution of the 4D-LUT correction process is not effective, the execution of the multi-color calibration is inhibited. Alternatively, an alarm is issued for the user. As a result, it is possible to avoid a situation in which although the user has performed the multi-color calibration, the effect of the correction that would otherwise be produced by the multi-color calibration is not obtained. In addition, it is possible to avoid the execution of the multi-color calibration for obtaining unnecessary correction values.

Other Embodiments

The present invention may be realized by executing the following process. That is, the present invention may be realized by executing a process executed by supplying software (program) for realizing the functions of the above-described embodiments to a system or an apparatus through a network or one of various storage media and reading the program using a computer (or a CPU, a microprocessor unit (MPU), or the like) of the system or the apparatus.

In addition, although the embodiments have been described while taking an electrophotographic apparatus as an example, an inkjet printer, a thermal printer, or the like may be used, instead, and the spirit of the present invention is not limited by the type of printer used. In addition, although the embodiments have been described while taking toner in electrophotographic printing as an example of a recording material, ink or any other recording material may be used instead of toner, and the spirit of the present invention is not limited by the type of recording material used.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A color image processing apparatus comprising:
   a first obtaining unit configured to obtain, using results of measurement of colors of single-color patch images formed by an image forming unit using single-color recording materials, single-color correction data used for causing reproduction characteristics of single colors formed by the image forming unit to be close to target values;
   a second obtaining unit configured to obtain, using results of measurement of colors of multi-color patch images formed by the image forming unit using a plurality of recording materials, multi-color correction data used for causing reproduction characteristics of multi-colors formed by the image forming unit to be close to target values;
   a first processing unit configured to, in a case that the image forming unit forms a color image, execute a correction process using the single-color correction data obtained by the first obtaining unit and the multi-color correction data obtained by the second obtaining unit;
   a second processing unit configured to, in a case that the image forming unit forms the color image, execute a correction process using the single-color correction data obtained by the first obtaining unit without using the multi-color correction data obtained by the second obtaining unit; and a control unit configured to perform processing of selectively causing the first processing unit and the second processing unit to operate.

2. The color image processing apparatus according to claim 1, wherein the control unit is settable to allow a user to choose, in a case that the color image formed by the image forming unit is obtained by executing a print job, whether the control unit causes the first processing unit to operate or the control unit causes the second processing unit to operate.

3. The color image processing apparatus according to claim 1, wherein the control unit is settable to allow a user to choose, in a case that the color image formed by the image forming unit is obtained by executing a copy job, whether the control unit causes the first processing unit to operate or the control unit causes the second processing unit to operate.

4. The color image processing apparatus according to claim 1, further comprising:
a display unit configured to display a screen for making settings for the processing executed by the control unit.

5. The color image processing apparatus according to claim 1, further comprising:
a display unit configured to display a screen for making settings for the processing executed by the control unit, wherein the display unit displays a screen for allowing a user to determine whether to select the first processing unit or to select the second processing unit in a case that the color image formed by the image forming unit is obtained by executing a copy job, and a screen for allowing a user to determine whether to select the first processing unit or to select the second processing unit in a case that the color image formed by the image forming unit is obtained by executing a print job.

6. The color image processing apparatus according to claim 1, wherein, in a case that the control unit causes the second processing unit to operate, the second obtaining unit does not obtain the multi-color correction data.

7. A color image processing method comprising:
first obtaining, using results of measurement of colors of single-color patch images formed by an image forming unit using single-color recording materials, single-color correction data used for causing reproduction characteristics of single colors formed by the image forming unit to be close to target values;
second obtaining, using results of measurement of colors of multi-color patch images formed by the image forming unit using a plurality of recording materials, multi-color correction data used for causing reproduction characteristics of multi-colors formed by the image forming unit to be close to target values;
first processing, in a case that the image forming unit forms a color image, to execute a correction process using the single-color correction data obtained by the first obtaining unit and the multi-color correction data obtained by the second obtaining;
second processing, in a case that the image forming unit forms a color image, to execute a correction process using the single-color correction data obtained by the first obtaining unit without using the multi-color correction data obtained by the second obtaining unit; and
performing control processing of selectively causing the first processing and the second processing to operate.

8. The color image processing method according to claim 7, wherein the performing control processing allows a user to choose, in a case that the color image formed by the image forming unit is obtained by executing a print job, whether the performing control processing causes the first processing to operate or the controlling causes the second processing to operate.

9. The color image processing method according to claim 7, wherein the performing control processing allows a user to choose, in a case that the color image formed by the image forming unit is obtained by executing a copy job, whether the performing control processing causes the first processing to operate or the performing control processing causes the second processing to operate.

10. The color image processing method according to claim 7, further comprising:
displaying a screen for making settings for the performing control processing.

11. The color image processing method according to claim 7, further comprising:
displaying a screen for making settings for the performing control processing, wherein the displaying displays a screen for allowing a user to determine whether to select the first processing or to select the second processing in a case that the color image formed by the image forming unit is obtained by executing a copy job, and a screen for allowing a user to determine whether to select the first processing or to select the second processing in a case that the color image formed by the image forming unit is obtained by executing a print job.

12. The color image processing method according to claim 7, wherein, in a case that the performing control processing causes the second processing to operate, the second obtaining does not obtain the multi-color correction data.

13. A non-transitory storage medium storing a program for causing a computer to execute the steps of:
first obtaining, using results of measurement of colors of single-color patch images formed by an image forming unit using single-color recording materials, single-color correction data used for causing reproduction characteristics of single colors formed by the image forming unit to be close to target values;
second obtaining, using results of measurement of colors of multi-color patch images formed by the image forming unit using a plurality of recording materials, multi-color correction data used for causing reproduction characteristics of multi-colors formed by the image forming unit to be close to target values;
first processing, in a case that the image forming unit forms a color image, to execute a correction process using the single-color correction data obtained by the first obtaining and the multi-color correction data obtained by the second obtaining;
second processing, in a case that the image forming unit forms a color image, to execute a correction process using the single-color correction data obtained by the first obtaining without using the multi-color correction data obtained by the second obtaining; and
performing control processing of selectively causing the first processing and the second processing to operate.

* * * * *